(12) United States Patent
Lea

(10) Patent No.: US 12,401,705 B2
(45) Date of Patent: *Aug. 26, 2025

(54) DYNAMIC USER-DEVICE UPSCALING OF MEDIA STREAMS

(71) Applicant: Microsoft Technology Licensing, LLC, Redmond, WA (US)

(72) Inventor: Perry Victor Lea, Eagle, ID (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 44 days.

This patent is subject to a terminal disclaimer.

(21) Appl. No.: 18/312,414

(22) Filed: May 4, 2023

(65) Prior Publication Data

US 2023/0275948 A1 Aug. 31, 2023

Related U.S. Application Data

(63) Continuation of application No. 17/089,328, filed on Nov. 4, 2020, now Pat. No. 11,683,358.

(51) Int. Cl.
*G06N 3/045* (2023.01)
*G06N 3/08* (2023.01)
(Continued)

(52) U.S. Cl.
CPC .......... *H04L 65/70* (2022.05); *G06N 3/08* (2013.01); *G06T 3/4046* (2013.01); *G06T 3/4053* (2013.01); *H04L 65/75* (2022.05)

(58) Field of Classification Search
CPC .......... G06N 3/045; G06N 3/08; G06N 3/084; G06T 3/4046; G06T 3/4053; H04L 65/70;
(Continued)

(56) References Cited

U.S. PATENT DOCUMENTS 10,547,858 B2   1/2020   Wang et al.
10,701,394 B1*  6/2020   Caballero ............... G06N 3/08
(Continued)

FOREIGN PATENT DOCUMENTS

CN   104778659 A    7/2015
CN   105049830 A   11/2015
(Continued)

OTHER PUBLICATIONS

"Intelligent Live Video & Image Upscaling", Retrieved from: https://web.archive.org/web/20191012013019/https://www.size.co/upscale/, Oct. 12, 2019, 4 Pages.

(Continued)

*Primary Examiner* — Asghar H Bilgrami
(74) *Attorney, Agent, or Firm* — Holzer Patel Drennan

(57) ABSTRACT

A method disclosed herein provides for receiving, at a user device, a media stream including frames of a first resolution generated by a graphics-rendering application and utilizing one or more weight matrices pre-trained in association with the graphics-rendering application to locally upscale each received frame of the media stream at the user device to a second resolution greater than the first resolution. Local upscaling of the media stream may be performed "on the fly," such as with respect to individual content streams (e.g., a game) or segments of content streams (e.g., a scene within a game).

20 Claims, 6 Drawing Sheets

(51) Int. Cl.
| | |
|---|---|
| G06N 3/084 | (2023.01) |
| G06N 3/088 | (2023.01) |
| G06N 3/09 | (2023.01) |
| G06T 3/4046 | (2024.01) |
| G06T 3/4053 | (2024.01) |
| H04L 65/70 | (2022.01) |
| H04L 65/75 | (2022.01) |
| H04L 65/80 | (2022.01) |
| H04N 21/4402 | (2011.01) |
| H04N 21/443 | (2011.01) |
| H04N 21/466 | (2011.01) |
| H04N 21/478 | (2011.01) |
| H04N 21/81 | (2011.01) |
| H04N 21/845 | (2011.01) |

(58) Field of Classification Search
CPC ....... H04L 65/75; H04L 65/764; H04L 65/80; H04N 21/440263; H04N 21/4666; H04N 21/8146; H04N 21/8456
See application file for complete search history.

(56) References Cited

U.S. PATENT DOCUMENTS

| | | | | |
|---|---|---|---|---|
| 2015/0172726 | A1* | 6/2015 | Faramarzi | H04N 19/132 375/240.24 |
| 2019/0005629 | A1* | 1/2019 | Sharma | G06T 3/4053 |
| 2019/0045168 | A1* | 2/2019 | Chaudhuri | G06T 7/55 |
| 2019/0378242 | A1* | 12/2019 | Zhang | G06T 3/4061 |
| 2020/0162789 | A1 | 5/2020 | Ma et al. | |
| 2020/0234406 | A1* | 7/2020 | Ren | G06T 5/001 |
| 2020/0364830 | A1* | 11/2020 | Manimaran | G06N 3/0454 |
| 2021/0073944 | A1* | 3/2021 | Liu | G06T 3/4046 |
| 2021/0097691 | A1* | 4/2021 | Liu | G06N 3/063 |
| 2021/0150663 | A1* | 5/2021 | Maiyuran | G06N 5/04 |
| 2022/0114702 | A1* | 4/2022 | Liu | G06T 3/4053 |
| 2022/0130013 | A1* | 4/2022 | Pottorff | G06T 1/20 |
| 2022/0138902 | A1* | 5/2022 | Lea | H04L 65/70 382/299 |

FOREIGN PATENT DOCUMENTS

| | | |
|---|---|---|
| CN | 111402130 A | 7/2020 |
| CN | 111861877 A | 10/2020 |
| WO | 2019120110 A1 | 6/2019 |
| WO | WO-2021260650 A1 * | 12/2021 |

OTHER PUBLICATIONS

"Application as Filed in U.S. Appl. No. 16/583,078", Filed Date: Sep. 25, 2019, 55 Pages.

Cox, et al., "LevelUp: A Thin-Cloud Approach to Game Livestreaming", In Proceedings of ACM Symposium on Edge Computing, Retrieved Date: Sep. 21, 2020, pp. 1-13.

Donaldson, Alex, "The Nvidia Shield's Incredible AI Upscaling Technology just got Better—including 4K, 60fps Gaming Upscaling", Retrieved from: https://www.vg247.com/2020/08/27/nvidia-shield-geforce-now-ai-upscaling-update/, Aug. 27, 2020, 5 Pages.

Jung, et al., "A Verification Framework of Neural Processing Unit for Super Resolution", In Proceeding of 20th International Workshop on Microprocessor/SoC Test, Security and Verification (MTV), Dec. 9, 2019, pp. 13-17.

Kennedy, et al., "Scaling up Anime with Machine Learning and Smart Real Time Algorithms", Retrieved from: https://medium.com/crunchyroll/scaling-up-anime-with-machine-learning-and-smart-real-time-algorithms-2fb706ec56c0, May 28, 2020, 12 pages.

Kim, et al., "RTSR: Enhancing Real-time H.264 Video Streaming using Deep Learning based Video Super Resolution", Retrieved from: https://insujang.github.io/assets/pdf/cs570_final.pdf, Jun. 8, 2017, pp. 1-6.

Filho, et al., "A GAN to Fight Video-related Traffic Flooding: Super-Resolution", In Proceedings of IEEE Latin-American Conference on Communications (LATINCOM), Nov. 2019, 7 Pages.

Chang, et al., "Optimizing FPGA-based Convolutional Neural Networks Accelerator for Image Super-resolution", In Proceedings of 23rd Asia and South Pacific Design Automation Conference (ASP-DAG), Jan. 22, 2018, pp. 343-348.

Kappeler, et al., "Video Super-Resolution With Convolutional Neural Networks", In Journal of IEEE Transactions on Computational Imaging, vol. 2, Issue 2, Jun. 2016, pp. 109-122.

International Search Report and Written Opinion Issued in PCT Application No. PCT/US2021/053451, Mailing Date: Jan. 25, 2022, 14 Pages.

Xue, et al., "Faster Image Super-resolution by Improved Frequency-domain Neural Networks", In Journal of Signal, mage and Video Processing, vol. 14, Issue 2, Aug. 23, 2019, pp. 257-265.

Notice of Acceptance Received for South Africa Application No. 2023/04232, mailed on Jul. 2, 2024, 1 page.

First Office Action Received for Chinese Application No. 202180074697.5, mailed on Apr. 16, 2025, 19 Pages (English Translation Provided).

Hu, et al., Meta-SR: A Magnification-Arbitrary Network for Super-Resolution, IEEE/CVF Conference on Computer Vision and Pattern Recognition, Jun. 2019, pp. 1575-1584.

Yu, et al., "Image Reconstruction Algorithm Based on Deep Convolution Neural Network", Computer Systems & Applications, Issue No. 09, Sep. 15, 2018, pp. 170-175.

Dong, et al., "Image Super-Resolution Using Deep Conventional Networks", IEEE Transactions on Pattern Analysis and Machine Intelligence, vol. 38, No. 2, Feb. 1, 2016, pp. 295-307.

Notice of Reasons for Rejection Received for Japan Application No. 2023-526218, mailed on Jul. 15, 2025, 7 pages. (English Translation Provided).

* cited by examiner

DYNAMIC USER-DEVICE UPSCALING OF MEDIA STREAMS

CROSS-REFERENCE TO RELATED APPLICATIONS

The present application claims priority to and is a continuation of U.S. application Ser. No. 17/089,328, entitled "DYNAMIC USER-DEVICE UPSCALING OF MEDIA STREAMS" and filed on Nov. 4, 2020, which is hereby incorporated by reference for all that it discloses or teaches.

BACKGROUND

Increasingly, more graphics media applications (e.g., games) are becoming cloud-based; however, streaming high-resolution video is extremely bandwidth intensive. Some home internet plans are insufficient to support streaming of quantities of high-resolution video at nominal frame rates. Additionally, high-resolution video streaming is memory and power intensive for cloud-based content providers. Lower-memory, lower-bandwidth, and lower-cost solutions are desired.

SUMMARY

According to one implementation, a method for increasing resolution of streamed graphics without increasing bandwidth consumption includes receiving, at a user device, a media stream including frames of a first resolution generated by a graphics-rendering application and utilizing one or more weight matrices pre-trained in association with the graphics-rendering application to locally upscale each frame of a media stream received at a user device to a second resolution greater than the first resolution.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other implementations are also described and recited herein.

DETAILED DESCRIPTION

Figure 1:
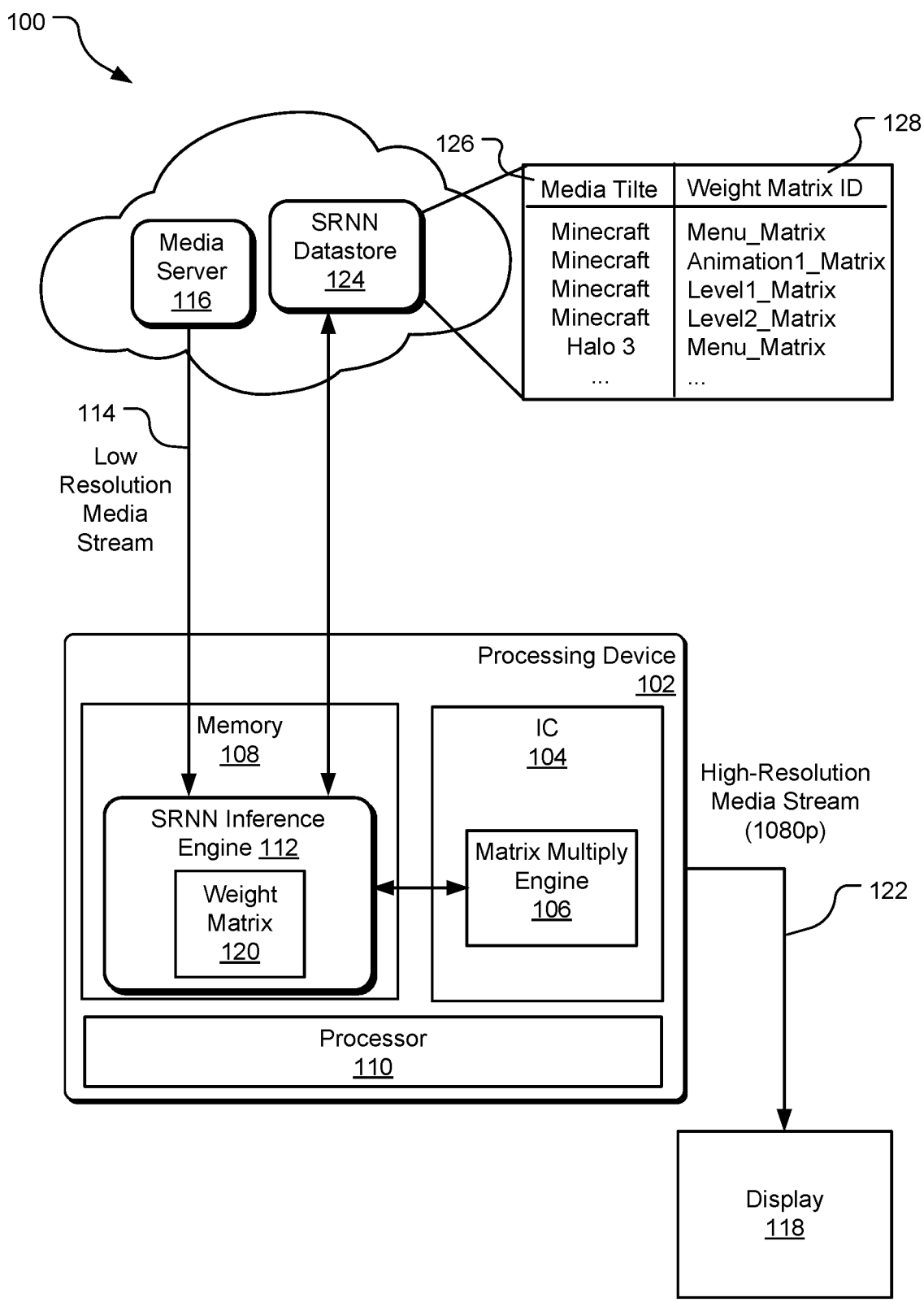
FIG. 1 illustrates an exemplary system that utilizes artificial intelligence executing on a user device to dynamically upscale the resolution of a received video stream of media content.

The herein disclosed technology provides a bandwidth-efficient solution for rendering, streaming, and upscaling media content to enable high-resolution (e.g., 4 k) content presentation on a user device display. According to one implementation, a media stream is broadcast to the user device at a first resolution that is much lower than a final resolution at which the graphics are finally presented on the user device. The user device locally executes actions to increase both resolution and image fidelity (e.g., detail).

Although some existing technologies are designed to locally enhance resolution of content streamed on user devices, these traditional solutions tend to rely on uniform scaling methods such as bicubic interpolation, bilinear interpolation, or "nearest-neighbor" methods that predict pixel values from the values of nearest neighbor pixels. All of these methods generally provide for uniform scaling of brightness/color of newly-added frame pixels according to static predefined values that are set in relation to values of nearby pixels in the original image. In these solutions, the final image resolution is increased, but the effect is underwhelming. Imagery becomes pixelated as the resolution increases, resulting in a "block-like" appearance that appears to be of lower resolution than it actually is.

In contrast to these traditional solutions, the presently-disclosed technology provides an image upscaling tool that increases the resolution of incoming frames on the fly (e.g., at 60 or 120 frames per second) by employing artificial intelligence that is trained to improve image fidelity by "filling in the gaps" such that newly-added pixels supply details that did not exist in the original frame. According to one implementation, the proposed solution allows frames to be rendered (e.g., by a game engine) at a low resolution, such as 720p or 1080p. The low-resolution frames are transmitted across a network to a user device and locally upscaled, using the AI-trained image upscaling tool, to a higher quality, such as 4 k.

Notably, server-level streaming at 4 k resolution entails transmitting a data stream that is four times the size of a 1080p resolution stream. For this reason, high-resolution media streaming places a cost burden on both data centers (e.g., high power and bandwidth costs) and on the end user (e.g., to ensure a home internet streaming setup that can support both high-bitrate and high-bandwidth streaming (e.g., 20 to 40 Mbps)). In contrast, a media stream with a 1080p resolution consumes a small fraction (e.g., 5 Mbps) of the bandwidth consumed by a 4 k. This bandwidth savings has meaningful implications to datacenters in terms of both bandwidth and power savings. Additionally, end users benefit because this reduction in bandwidth is achieved while also realizing improvements in video quality and fidelity. For users, a savings in bandwidth translates to improvements in latency (as more bandwidth can be steered to controller response) and to monetary cost savings due to reduced need for high data caps provided by more expensive internet plans.

The resolution enhancement solutions described herein allow a media stream to be transmitted at a lower resolution and viewed at a comparatively high resolution without a corresponding loss in frame rate or content and with a significant savings in bandwidth. The foregoing is also achieved while consuming less bandwidth as well as less power and reduced memory during the actual frame rendering (e.g., by the application or game server) since this rendering occurs at a lower resolution. In various implementations, this technology can be applied to improve quality (image fidelity) and/or frame rates depending upon how the user, game developer, and cloud application streaming provider leverage the technology.

FIG. 1 illustrates an exemplary system 100 that utilizes artificial intelligence (AI) executing on a user device to dynamically upscale the resolution of a received video stream of media content. The system 100 includes processing device 102 that may take on a variety of forms in different implementations including without limitation those of a laptop or tablet, desktop computer, gaming console, smart phone, etc. The processing device includes hardware, shown as integrated circuit (IC) 104, that includes a matrix multiply engine 106, also sometimes referred to as a matrix math accelerator. For example, the IC 104 may be include one or more standard silicon systems-on-chip (SoCs), application specific integrated circuits (ASICS), or FPGAs. According to one implementation, the matrix multiply engine 106 is implemented as a systolic multiplier array that is easily programmable and efficiently applied to any neural network.

In addition to the IC 104 and the matrix multiply engine 106, the processing device 102 further includes memory 108 and a processor 110. The memory 108 and processor 110 are shown as external to the IC 104; however, it should be understood that the IC 104 may include additional memory and/or one or more processors in addition to the processor 110. A super-resolution neural net (SRNN) inference engine 112 is stored within the memory 108 and executable by the processor 110. In other implementations, some or all aspects of the SRNN inference engine 112 are stored within memory of the IC 104 and/or executed by processor(s) of the IC 104.

The SRNN inference engine 112 includes software that is executable by the processor 110 to dynamically upscale (or upsample) graphics frames of an incoming low-resolution media content stream 114 as the frames arrive at the processing device 102 from a media server 116. Although "low-resolution" is a relative term when used independently, this term is used throughout this description with respect to a media content stream that is received at a user device and that is of lower resolution and/or inferior detail to that of a final media content stream (e.g., a high-resolution media stream 122) that is rendered on a display 118 of the processing device 102. As used herein, "upscaling" refers to an increase in image resolution and fidelity (detail).

In different implementations, the media server 116 may take on a variety of forms including those of one or more different web-based servers and/or edge devices that host and/or generate media content. For example, the media server 116 may be a cloud-based gaming service (xCloud) or application server that stores and executes graphics-generating applications to generate the low-resolution media stream 114 that is, in turn, streamed to user devices (e.g., the processing device 102).

In one implementation, the SRNN inference engine 112 is preloaded with trained weights stored in a weight matrix 120 that is used by the SRNN inference engine 112 to transform each input frame of the low-resolution media stream 114 to a corresponding output frame of the high-resolution media stream 122. In various implementations, the trained weights may be transmitted either before or during the streaming of the low-resolution media stream 122 to the processing device 102. For a single graphics rendering application, there may exist multiple weight matrices trained to upscale content for different segments of an associated media stream. In one example where the low-resolution media stream 122 is game content, a new game scene may use video content and styles different from the previous game scene. In this case, the new game scene may be upscaled by loading the matrix multiple engine 106 with a weight matrix that is different than a weight matrix used for the previous scene.

In various implementations, different weight matrices associated with a same media content stream may be transmitted to the processing device 102 in different ways. In one implementation, the weight matrices are sent as a bulk package to the processing device 102 and cached locally for a period of time. The locally-stored weight matrices may be selectively loaded into the matrix multiple engine 106 when their associated frame segments are streamed and/or processed for local rendering. In another implementation, the different weight matrices for the low-resolution media stream 122 are sent to the processing device 102 individually before or during scene transitions associated with a new matrix. In this scenario, the processing device 102 does not have to cache a large amount of information. In still another implementation, the different weight matrices are streamed concurrent with the low-resolution media stream 122 in anticipation of an upcoming point in time when each matrix is to be loaded and used.

In one implementation where the weight matrices are sent in bulk and/or cached locally on the processing device 122, the graphics-rendering application at the media server 116 may inform the processing device through an established API to use the correct weight matrix for each individual scene being displayed. This may, for example, be achieved by tagging each of the weight matrices with metadata indicating which frame segment(s) are to be upscaled with each weight matrix stored in local in local memory.

When the low resolution media stream 122 stops (e.g., a game completes or the user stops the stream), locally stored data may be versioned, allowing the developer to change the quality of the trained weights on game updates.

In one implementation, the SRNN inference engine 202 is a convolutional neural network (CNN) that includes several convolution layers that collectively provide for the translation of each feature in the original, low-resolution input frame to a corresponding higher-resolution version of the feature. Matrix multiplications utilized to upscale each input image to a corresponding super-resolution output image may be performed by the matrix multiply engine 106. In other implementations, these mathematical computations are performed partially or exclusively by software elements rather than hardware elements.

In one implementation, the weight matrix 120 is derived during a training process that utilizes stochastic descent or similar methodology to identify a set of weights that achieve a desired effect in the translation between input (low-res) and output (high-res) images. As opposed to graphics upscaling solutions that provide for uniform selection of pixel values based on static interpolations, the weight matrix 120 is trained to provide scaling weights for a particular segment or group of frames of predefined granularity, such as a groups of frames associated with a same media title (e.g., a game, application, or video). In one implementation, the weight matrix 120 is trained on a per-title basis such that a different weight matrix is loaded into memory of the SRNN inference engine 112 each time a user launches a different cloud-based application hosted by the media server 116. For example, each time a user launches a game hosted by the media server 116, the SRNN inference engine 112 identifies, retrieves, and loads a matrix with weights trained specifically for the game. In another implementation, the weight matrix 120 is trained on a per-scene basis such that each individual scene within a video or game is upscaled using a different weight matrix that is specifically trained for that scene.

In FIG. 1, the weight matrix 120 is shown as being retrieved from a cloud-based SRNN datastore 124. In the illustrated example, the SRNN datastore 124 stores weight matrices trained for different media titles (graphics-rendering applications), where each weight matrix is stored in association with a media title 126 and weight matrix ID 128. For example, the media title "Minecraft" is shown as being stored in association with multiple different weight matrix IDs, where each title/id pair (e.g., [media title, matrix ID]) uniquely identifies a weight matrix that is trained to upscale a discrete, predefined segment of frames associated with the media title. As used herein, a "segment" of frames refers to a collection of either consecutive or non-consecutive frames associated with a same media title. For example, each weight matrix is used to upscale a different segment of frames including, for example, a segment of frames depicting a particular animation, a segment of frames depicting a particular scene, or a segment of frames pre-identified as having a common characteristic, such as text or menu options.

By example and without limitation, the weight matrix identified by the media title "Minecraft" and weight matrix ID "Level_1" may be trained using a subset of frames rendered during "Level 1" of Minecraft and used by the SRNN inference engine 112 to perform upscaling actions with respect to all frames rendered during Level 1. Likewise, the matrix identified by the media title "Minecraft" and weight matrix ID "menu_matrix" may be trained using frames generated by Minecraft that include menu icons or text and used by the SRNN inference engine 112 to upscale all frames depicting menu content. Further still, the exemplary matrix identified by the media title "Minecraft" and weight matrix ID "Animation1_matrix" may be trained using frames that render some aspect of a same animation. This matrix may be used to upscale all frames depicting aspects of the animation.

Since the weight matrices are each trained based on a limited and predefined segment of frames generated during execution of a same media executable (e.g., a same game), the resulting fidelity enhancements of each output frame fill in details that may be unique to the segment of frames used to train the corresponding weight matrix (e.g., color gradients, shadowing effects) despite the fact that these details may vary significantly between titles and even between different segments of a same title. The result is a more realistic and visually appealing rendering of the frame content than achievable by using a weight matrix trained based on frames from many different media titles or traditional upscaling approaches such as pixel interpolation.

Figure 2:
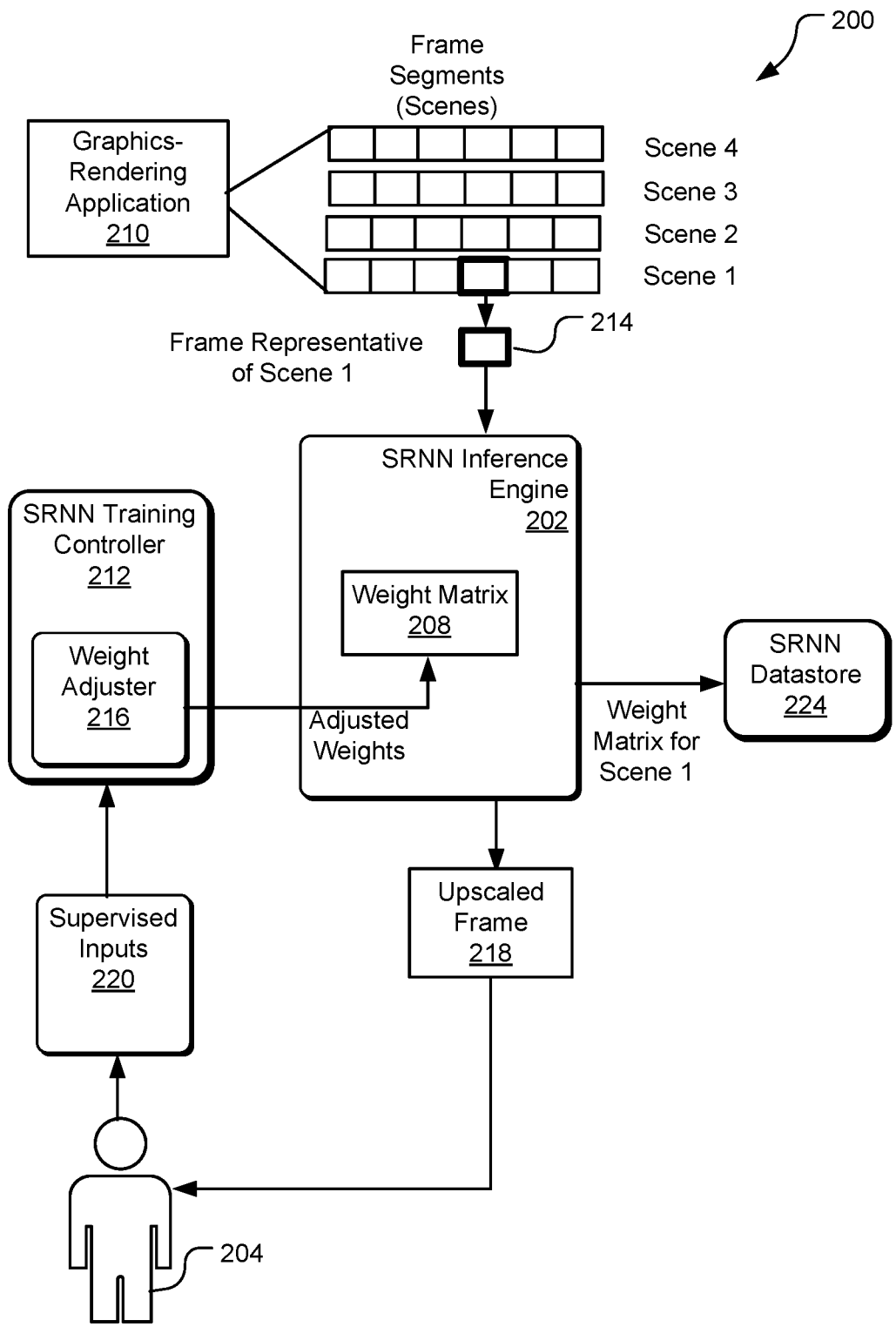
FIG. 2 illustrates a system that performs exemplary training operations for generating a weight matrix usable to dynamically upscale the resolution of a graphics frame data streamed to a user device.

FIG. 2 illustrates a system 200 performing exemplary training operations for generating a weight matrix 208 usable to dynamically upscale the resolution of a graphics frame data streamed to a user device. The system 200 includes an SRNN inference engine 202, which may include characteristics the same or similar to those discussed above with respect to FIG. 1. During the illustrated operations, the weight matrix 208 is trained to provide image upscaling in association with graphics of a single media title. As used herein, a "media title" refers to a particular graphics-rendering application (e.g., a game) that includes the executables for generating video content of a media content stream. In FIG. 2, a developer 204 initiates operations to train weights of the weight matrix 208 is association with a graphics-rendering application 210.

In different implementations, the developer 204 may elect to generate a single weight matrix 208 for the graphics-rendering application or multiple different weight matrices for the graphics-rendering application 210. For example, a single weight matrix may be generated and used to provide image upscaling for all frames generated by the graphics-rendering application 210; alternatively, different weight matrices may be used to provide image upscaling for different segments of frames (e.g., different scenes, different animations, and/or groupings based on other visual characteristics shared between frames of each group).

In the example of FIG. 2, the developer 204 trains the weight matrix 208 with a subset of frames selected from a single individual scene ("Scene 1"), which may be an animation, game level, or particular scene within a game level. In this exemplary step, the developer 204 selects a training frame 214 from Scene 1 that is representative of the types of graphics present in Scene 1. Although not shown, the developer 204 may also select one or more additional frames to be used to train the weight matrix for Scene 1. Each selected representative frame is provided as a training input the SRNN inference engine 202.

Upon receipt of the training frame 214, the SRNN inference engine 202 uses predefined (e.g., initially default) weights in the weight matrix 208 to generate a proposed upscaled version of the training frame 214. In one implementation, the SRNN inference engine 202 includes several convolution layers in a traditional neural network design. Each different convolution layer can create subsequent feature maps that are fed into the next layer. For example, each convolution layer may serve to map an individual image feature or collection of features to a higher resolution feature or collection of features.

In FIG. 2, the proposed upscaled version of the training frame 214 is represented in FIG. 2 as "upscaled frame 218." Generation of the upscaled frame 218 entails both (1) increasing image resolution of the training frame 214 by a predefined factor (e.g., from 720p to 4 k) and (2) defining a proposed value for each pixel newly-added to the frame based on the current weights included in the weight matrix 208. These weights may be adjusted throughout the training process using traditional techniques such as training, back-propagation, and gradient descent mechanisms. This training may be achieved via either supervised or unsupervised training techniques.

In one implementation that utilizes unsupervised learning, the SRNN training controller 212 compares each upscaled image (e.g., the upscale image frame 218) to a true high resolution image (e.g., a 4 k or higher resolution image) that has been rendered traditionally and completely. For example, the upscaled frame 218 may be compared to a high resolution image or set of images selected by the SRNN training controller 212 or by the developer 204. Adjustments may be automatically implemented by the SRNN training controller 212 to reduce the discrepancies between the upscaled frame 218 and the true high resolution image. In this implementation, the training process may keep re-iterating the training set until the upscaled frame 218 output best approximates the true high resolution image.

Still other implementations implement a hybrid approach in which the adjuster 216 adjusts the weights using both supervised and unsupervised inputs.

By example and without limitation, the system 200 is shown utilizing a supervised learning approach rather than an unsupervised approach. Here, the SRNN training controller 212 utilizes inputs from a developer 204 to best approximate the quality intended for each frame segment.

For example, developer 204 previews the upscaled frame 218 and provides a Yes/No input to the SRNN training controller 212, where the Y/N inputs indicates whether the upscaled frame 218 satisfies certain aesthetic acceptability criteria. For example, the developer 204 may notice that the upscaled frame 218 does not realistically enhance certain areas of the frames (e.g., certain objects appear too pixelated or shadows appear to spill over into areas they should not).

The determination of whether the upscaled frame 218 satisfies certain aesthetic acceptability criteria is, in the illustrated supervised learning approach, subjective to the preferences of the individual developer. This, in effect, leverages AI to identify weights for the weight matrix 208 that are effective to implement artistically-subjective resolution enhancements that improve image fidelity (adding image details) as opposite to merely interpolating existing pixel values to determine new pixel values.

If the developer 204 is not satisfied with the upscaled frame 218, the developer 204 provides a "no" as the supervised input 220 and a weight adjuster 216 of the SRNN training controller 212 computes adjusted weight values for the weight matrix 208. Using the adjusted weight values, the SRNN inference engine 202 re-generates the upscaled frame 218, and the developer 204 may again provide the supervised input 220. The above-described adjustment of weights and regeneration of the upscaled frame 218 may be cyclically performed a number of different times until the developer 204 provides a "Yes" as the supervised input 220 to the SRNN training controller 212, indicating that the upscaled frame 218 satisfies the aesthetic acceptability criteria. In addition to the supervised inputs 220, the weight adjuster 216 may, at each iteration, utilize one or more additional CNN traditional training techniques to determine weight adjustments.

If the developer has elected any other training frames for the same weight matrix (e.g., other training frames representative of Scene 1 in addition to the training frame 214), the above-described operations may be repeated with the current values of the weight matrix 208 being used as starting values for the corrective operations with respect to the next-received training input frame. In some implementations, the developer 204 may elect to train the weight matrix 208 on a single frame. In other implementations, the weight matrix 208 may be trained on multiple frames.

One the above-described training operations are performed with respect to each training frame (e.g., training frame 214) selected with respect to a given frame segment (e.g., Scene 1), the SRNN inference engine 202 outputs the weight matrix 208 to an SRNN datastore 224, which may have features the same or similar as those described with respect to the SRNN datastore 124 of FIG. 1.

In this way, the weight matrix 208 is trained on a subset of frames selected from a given frame segment ("Scene 1") and the final version of the weight matrix 208 is used during live media streaming operations to dynamically adjust resolution and fidelity of each frame of the given frame segment as those frames are received at a user device. Different weight matrices may be similarly generated and used with respect to a variety of different frame segments of the media content stream generated by the graphics-rendering application 210.

Figure 3:
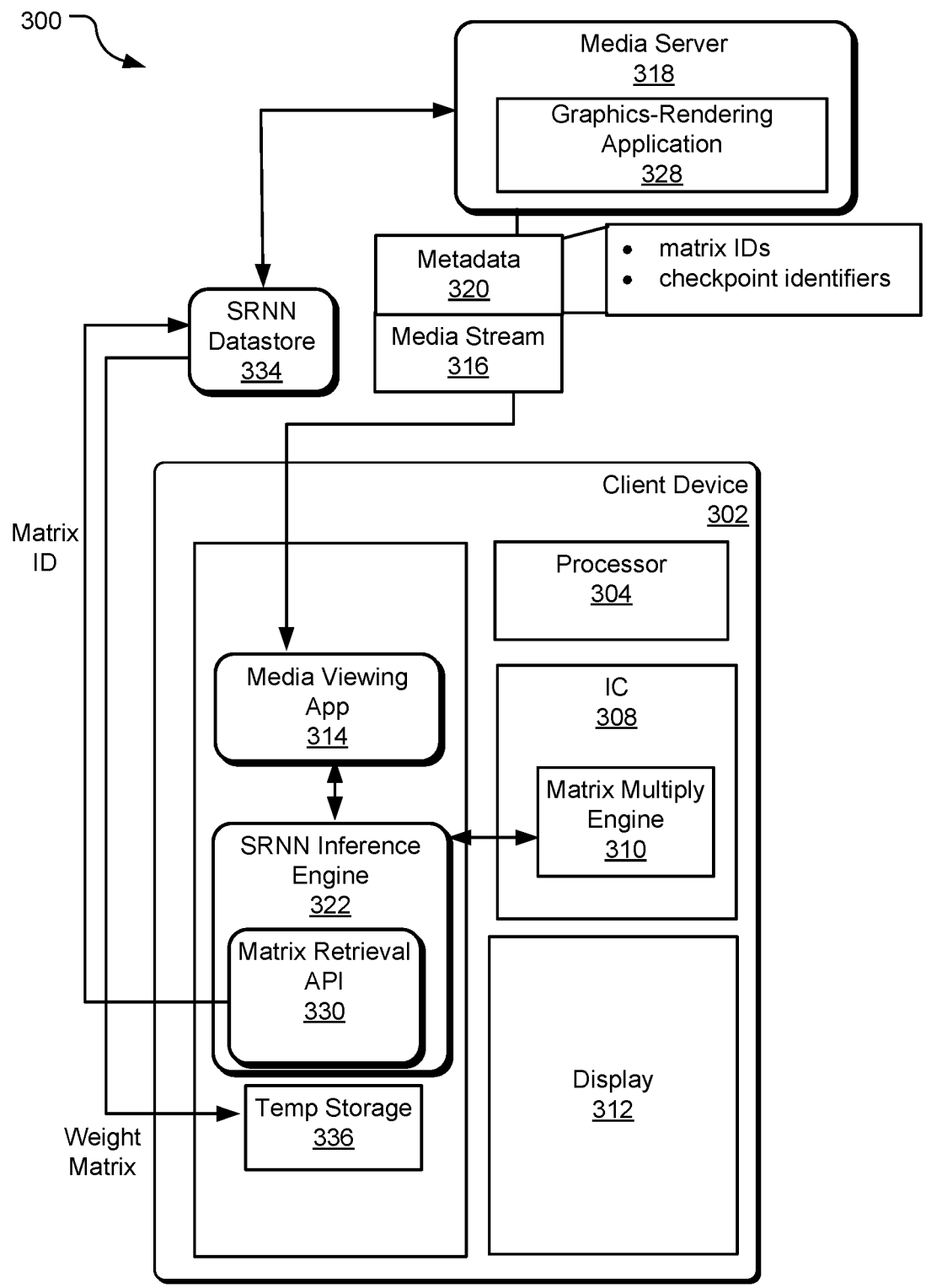
FIG. 3 illustrates a system that performs operations to dynamically upscale the resolution and fidelity of graphics frame data received at a user device.

FIG. 3 illustrates a system 300 that performs exemplary operations to dynamically upscale the resolution and fidelity of graphics frame data received at a user device. In one implementation, the user device 302 is a mobile device with reduced memory and/or processing capability as compared to most PCs and gaming consoles. For example, the user device 302 may be a tablet or a cell phone. The user device 302 includes many elements the same or similar to like-named elements described with respect to FIG. 1, including for example, a processor 304, memory 306, which may include a combination of volatile and non-volatile memory, an IC chip 308 including a matrix multiply engine 310, and a display 312.

The memory 306 of the user device 302 stores a media viewing application 314 that performs actions for presenting on the display 312 a received stream (e.g., media stream 316) of video content that is generated by a graphics-rendering application 328 hosted by a media server 318.

The graphics-rendering application 328 retrieves or generates the content of the media stream 316 and initiates transmission of such content to the user device. For example, the graphics-rendering application may be a cloud-based game engine or video streaming tool. In contrast, the media viewing application 314 is a locally-installed application (e.g., a web plug-in) that receives frame data within the media stream 316 and generates rendering instructions that instruct low-level graphics hardware (not shown) to render the frame data to the display 312. In one implementation, the media viewing application 314 includes logic for communicating with a locally-executing SRNN inference engine 322 that upscales (increases resolution and fidelity) of each frame that is received within the media stream 316 before the frame is rendered on the display 312.

In the illustrated implementation, the media stream 316 includes video data which may, for example, include streamed video (e.g., movies, TV), gaming graphics, etc. In the illustrated implementation, the media server 318 also provides metadata 320 to the user device 302 in association with the media stream 316. The metadata 320 helps the SRNN inference engine 322 identify one or more specific weight matrices needed to upscale the frames of the media stream 316 as well as appropriate times for loading each identified weight matrix into the memory 306.

The metadata 320 may be included with the media stream 316 (e.g., appended to individual video frame packets) or be transmitted separately, such as at a time before the transmission of the media stream 316. In one implementation, the media viewing application 314 requests and receives the metadata 320 from the media server 318 at a time when a user first launches a particular cloud-based application, such as when the user launches a game (or a new level of a game) hosted by the media server 316.

For example, upon loading of each new scene of the graphics-rendering application, the media server 318 may transmit packet(s) of the metadata 320 that include weight matrices for upscaling the frames of the scene or that that include information usable by the user device 302 to independently acquire and store such weight matrices.

In the illustrated implementation, the metadata 320 includes a list of weight matrix identifiers (e.g., matrix IDs) that each identify a corresponding weight matrix that has been pre-trained on a subset of frames from the media stream 316 to facilitate the upscaling of a discrete, pre-defined segment of frames within the media stream 316. Each matrix identifier in the metadata 320 is transmitted to the user device 302 in association with a checkpoint identifier that identifies a particular location within the media stream 316 at which the associated weight matrix is to be loaded into memory utilized by the SRNN inference engine 322. For example, the checkpoint identifier may include one or more time stamps or frame numbers. Each checkpoint identifier is usable to identify a frame segment within the media stream 316 that is to be upscaled based on weights of the corresponding weight matrix. For example, the metadata 320 may include a matrix identifier "Level1_matrix" in connection with a timestamp or frame number identifying the start of a segment of frames within the media stream 316 that are to be upscaled using the matrix with the ID "Level1_matrix." The media viewing application 314 provides the metadata 320 to the SRNN inference engine 322, and the SRNN inference engine 322 uses this metadata 320 to determine when to dynamically retrieve and load each different weight matrix that has been trained with respect to the graphics-rendering application 328.

The SRNN inference engine 322 includes a matrix retrieval API 330 that dynamically requests select weight matrices from an SRNN datastore 334 during the presentation of the media stream 316 on the display 312. For example, the matrix retrieval API 330 may track a location of a current play pointer within the media stream 316 and an offset between the read pointer and each of the checkpoint identifiers identified in the metadata 320. When the read pointer is within a predefined offset of a location identified by a given one of the checkpoint identifiers, the matrix retrieval API 330 queries the SRNN datastore 334 with the associated matrix ID (which may in some cases include both an identifier for the graphics-rendering application 328 and an identifier for the weight matrix). In response, the SRNN datastore 334 transmits the corresponding weight matrix back to the SRNN inference engine 322, and the weight matrix is loaded into temporary storage 336 on the user device 302. This weight matrix is dynamically from the temporary storage 336 and into the SRNN inference engine 322 at a time selected based on the associated checkpoint identifier. Once loaded into the SRNN inference engine 322, the weight matrix is used to upscale the frame segment corresponding checkpoint identifier.

In one implementation, the temporary storage 336 is a buffer that stores a small number the weight matrices for the graphics-rendering application 328 at a time. Once used to upscale the associated frame segment, each weight matric in the buffer 336 may be over-written with a newly-retrieved weight matrix. In this sense, the user device 302 does not need to simultaneously store all weight matrices that have been predefined with respect to the graphics-rendering application, reducing storage requirements.

Figure 4:
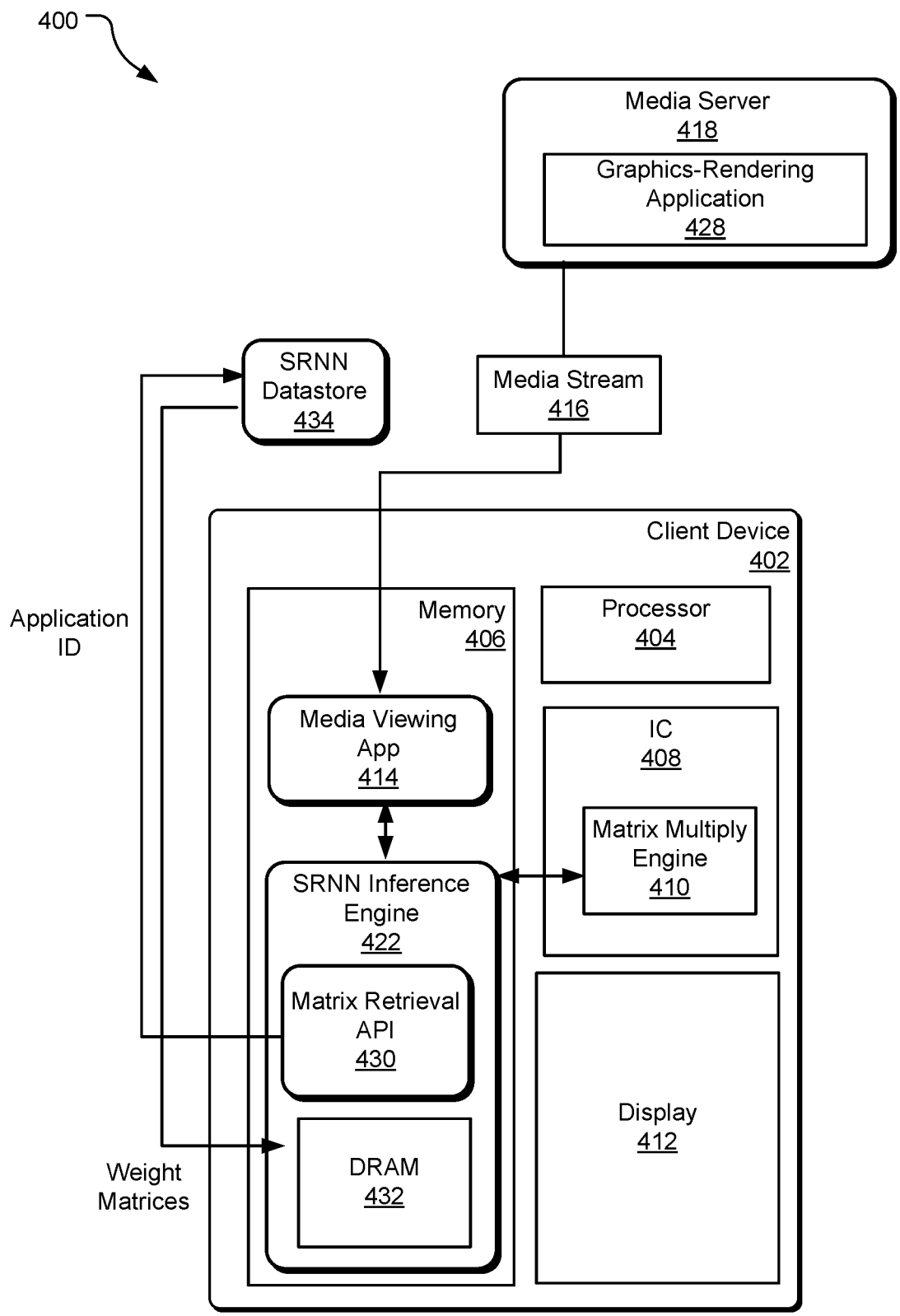
FIG. 4 illustrates another example system that performs operations to dynamically upscale the resolution and fidelity of graphics frame data received at a user device.

FIG. 4 illustrates another example system 400 that performs operations to dynamically upscale the resolution and fidelity of graphics frame data received at a user device 402. The user device 402 includes many of the same hardware and software components as those described with respect to FIG. 3 including, for example, a media server 418 that hosts graphics-rendering application 428. The graphics-rendering application 428 renders graphics and transmits a media stream 416 to the user device 402. At the user device 402, an SRNN inference engine 422 performs actions utilizing a matrix multiple engine 410 (integrated within IC 408) to upscale each frame of the media stream 416 before the frame is rendered, by a media viewing application 414, to a display 412 of the user device 402.

The user device 402 differs from the user device 302 of FIG. 3 in that the user device 402 has a larger amount of local memory (e.g., DRAM 432) allocated for use by the SRNN inference engine 422 than the user device 302 of FIG. 3. Consequently, the SRNN inference engine 422 is able to concurrently store a large number of weight matrices in the DRAM 432 rather than dynamically retrieve such matrices on an as-needed basis.

In one implementation, the SRNN inference engine 422 receives and stores some or all weight matrices for the graphics-rendering application in the DRAM 432 in advance of the streaming and local rendering. For example, all of the weight matrices for the graphics-rendering application 428 may be downloaded and stored at the time that a user first begins streaming from the graphics-rendering application 428 or at a time when the media viewing application 414 is downloaded on the user device 402.

Rather than request matrices one-by-one on an as-needed basis, a matrix retrieval API 430 of the SRNN inference engine 422 queries an SRNN datastore 434 with an application ID (e.g., a media title or other identifier associated with a graphics-rendering application 428) and is, in return, sent a group of weight matrices trained with respect to different segments of the graphics-rendering application 428.

Figure 5:
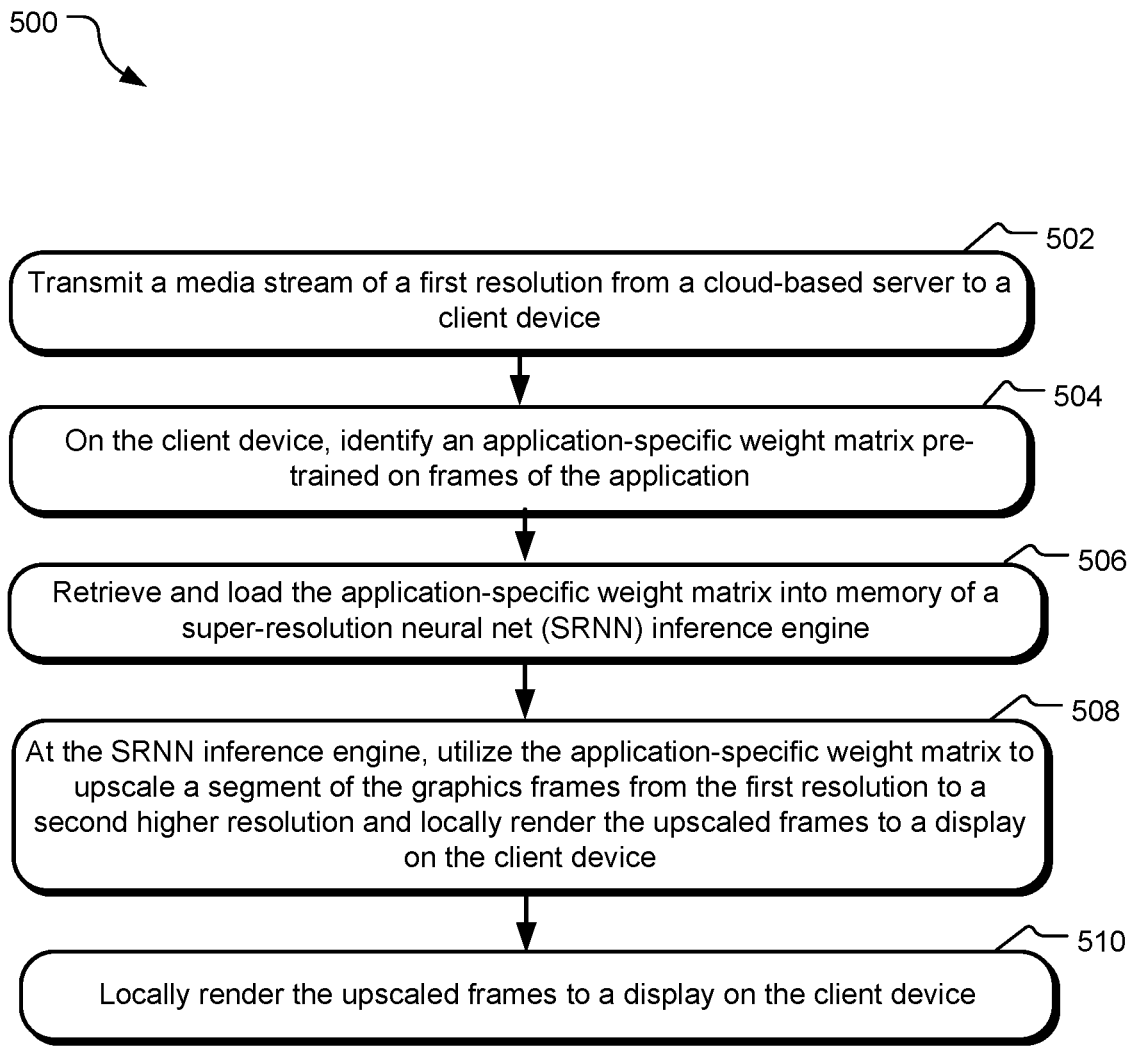
FIG. 5 illustrates example operations for upscaling frames of a media stream received at a user device.

FIG. 5 illustrates example operations 500 for upscaling frames received at a user device within a media stream without increasing bandwidth, cost, memory, power, or bitrate. A streaming operation 502 streams a media stream to a user device. Each frame of the media stream is of a first resolution and has been generated by a cloud-based graphics-rendering application.

A weight matrix identification operation 504 identifies an application-specific weight matrix that has been pre-trained on frames of the application to upscale a segment of the graphics frames from the first resolution to a second higher resolution. According to one implementation, the weight matrix identification operation 504 is performed by an SRNN inference engine locally-executing on the user device. The identified weight matrix is, in one implementation, a weight matrix that has been trained based on a training set that exclusively includes frames generated by the same graphics-rendering application.

Once the appropriate weight matrix has been identified, a retrieval and loading operation 506 retrieves and loads the application-specific weight matrix into an SRNN inference engine. In one implementation, the application-specific weight matrix is loaded into an SRAM structure. Retrieving the weight matrix may entail either (1) locating the matrix from a repository stored on the user device or (2) querying a remote datastore for the matrix.

An image upscaling operation 508 uses the application-specific weight matrix to upscale a segment of the graphics frames from the first resolution to a second higher resolution and locally renders the upscales frames to a display on the user device, and an image rendering application locally renders the upscaled frames to a display of the client device.

The above-described technology allows developers (e.g., game studios) to produce one or more different weight matrices that are optimal for each game title. This, in effect, uses AI to add pixels and detail to each image based on a matrix that has been trained specifically for the media title to better portray the overall look and feel of each frame.

The matrices are passed to the user device and executed locally. According to one implementation, the weight matrices can be changed and versioned to allow for quality adaptations in association with any changes to the game such as to enable release of new levels, scenes, maps, etc.

Figure 6:
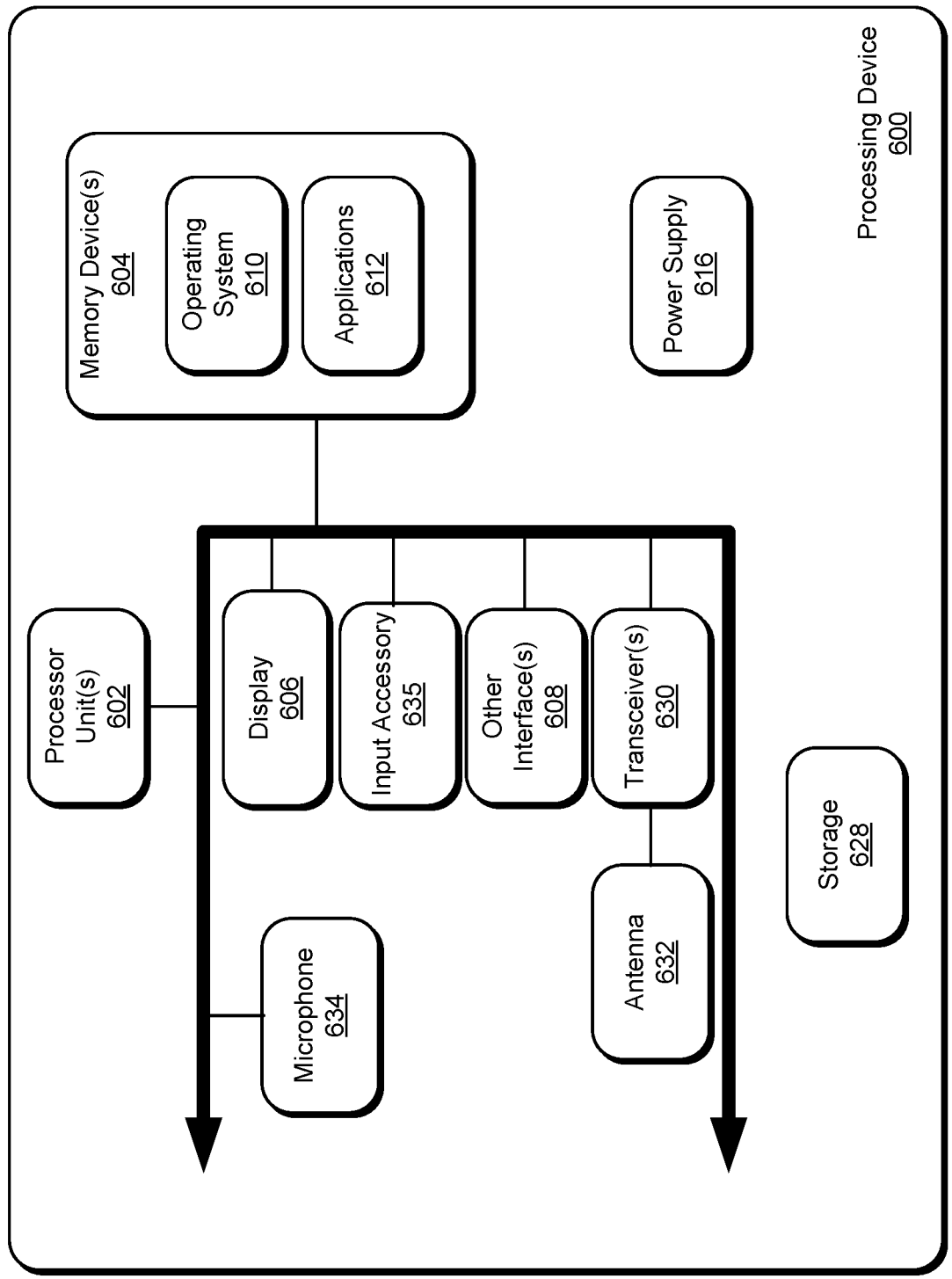
FIG. 6 illustrates an example schematic of a processing device suitable for implementing aspects of the disclosed technology.

FIG. 6 illustrates an example schematic of a processing device 600 suitable for implementing aspects of the disclosed technology. The processing device 600 includes one or more processor unit(s) 602, memory 604, a display 606, and other interfaces 608 (e.g., buttons). The memory 604 generally includes both volatile memory (e.g., RAM) and non-volatile memory (e.g., flash memory). An operating system 610, such as the Microsoft Windows® operating system, the Microsoft Windows® Phone operating system or a specific operating system designed for a gaming device, resides in the memory 604 and is executed by the processor unit(s) 602, although it should be understood that other operating systems may be employed.

One or more applications 612, such as an SRNN inference engine, are loaded in the memory 604 and executed on the operating system 610 by the processor unit(s) 602. The applications 612 may receive input from various input devices such as a microphone 634 or input accessory 636 (e.g., keypad, mouse, stylus, touchpad, gamepad, racing wheel, joystick). The processing device 600 includes a power supply 616, which is powered by one or more batteries or other power sources and which provides power to other components of the processing device 600. The power supply 616 may also be connected to an external power source that overrides or recharges the built-in batteries or other power sources.

The processing device 600 includes one or more communication transceivers 630 and an antenna 632 which may provide network connectivity (e.g., a mobile phone network, Wi-Fi®, Bluetooth®). The processing device 600 may also include various other components, such as a positioning system (e.g., a global positioning satellite transceiver), one or more accelerometers, one or more cameras, an audio interface (e.g., a microphone 634, an audio amplifier and speaker and/or audio jack), and storage devices 628. Other configurations may also be employed.

In an example implementation, a mobile operating system, various applications (e.g., an SRNN inference engine) and other modules and services may have hardware and/or software embodied by instructions stored in memory 604 and/or storage devices 628 and processed by the processor unit(s) 602. The memory 604 may be memory of host device or of an accessory that couples to a host.

The processing device 600 may include a variety of tangible computer-readable storage media and intangible computer-readable communication signals. Tangible computer-readable storage can be embodied by any available media that can be accessed by the processing device 600 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 600. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

An example method disclosed herein provides for receiving, at a user device (e.g., FIG. 1, processing device 102), a media stream (e.g., FIG. 1, media stream 122) including frames of a first resolution generated by a graphics-rendering application and utilizing, on the user device, one or more weight matrices (e.g., FIG. 1, weight matrix 120) pre-trained in association with the graphics-rendering application to locally upscale each received frame of the media stream to a second resolution greater than the first resolution. The method further provides for rendering the upscaled frames of the media stream to a display of the user device. This allows for a reduction in bandwidth without a negative impact on video fidelity or quality from the perspective of the end user.

In another example method according to any preceding method, each of the frames is upscaled to the second resolution using a select weight matrix of the one or more weight matrices trained in association with the graphics rendering application, and the upscaling of each of the frames providing for supplementation of the frame with additional detail derived based on the associated select weight matrix. The use of scene-specific or application-specific weight matrices leverages AI to add pixels and detail to each image based on a matrix that has been trained specifically for the media title to better portray the overall look and feel of each frame.

Yet another example method of any preceding method further provides for transmitting, from the user device, a request for a select weight matrix. The request specifies a matrix identifier stored in a remote database in association with a media title for the graphics-rendering application. In response to transmission of the request, the weight matrix is received and locally stored on the user device. The method further provides for dynamically loading a super-resolution neural net (SRNN) inference engine (e.g., FIG. 1, SRNN engine 112) with the select weight matrix when the rendering operation reaches a predefined checkpoint within the media stream. This dynamic retrieval and loading of the weight matric(es) reduces the quantity of memory resources on the user device that are sufficient to implement the above solution.

In yet still another example method of any preceding method, multiple weight matrices are pre-trained in association with the graphics-rendering application and the method further provides for loading of the SRNN inference engine with a different one of the weight matrices upon reaching each of multiple predefined checkpoints during the presentation of the media stream.

In yet still another example method of any preceding method, multiple weight matrices are pre-trained in association with the graphics-rendering application and each of the weight matrices are trained with frames sampled from an associated one of multiple different discrete frame segments of the media stream. For example, scene-specific weight matrices may be created to allow for resolution and fidelity enhancements specifically tuned for the features and tonal profiles that are unique to different scenes.

In another example of method of any preceding method, each of the weight matrices is used to dynamically upscale frames of the associated one of the multiple different discrete frame segments during media streaming operations.

In yet still another example method of any preceding method, the user device is a gaming console and the one or more weight matrices are stored on the console for dynamic loading into a super-resolution neural net (SRNN) inference engine at select times association with different checkpoints within the media stream.

In yet still another example method of any preceding method, the user device is a mobile device and the method further comprises receiving and storing metadata (e.g., FIG. 3, metadata 320) for the graphics-rendering application. The metadata specifies matrix identification information uniquely identifying multiple different weight matrices pre-trained for the graphics-rendering application and further specifies checkpoint identifiers each identifying a checkpoint location within the media stream at which to load an associated one of the multiple different weight matrices into a super-resolution neural net (SRNN) inference engine. This metadata may provide a user device with sufficient information to identify weight matrices trained with respect to different scenes in a media stream and for dynamically loading those weight matrices at appropriate times.

An example device disclosed herein includes a super-resolution neural net (SRNN) inference engine (e.g., FIG. 1, element 112) stored in memory of a user device (e.g., FIG. 1, 102). The SRNN inference engine is configured to receive a media stream (e.g., FIG. 1, low-resolution media stream 114) including frames of a first resolution generated by a graphics-rendering application; utilize one or more weight matrices (e.g., FIG. 1, weight matrix 120) pre-trained in association with the graphics-rendering application to locally upscale each of multiple frames received within the media stream from the first resolution a second resolution greater than the first resolution. The system further includes a media viewing application locally executing on the device that presents the upscaled frames of the media stream to a display of the user device (e.g., FIG. 1, user device 102 presents high-resolution media stream 122).

In another example system of any preceding system, upscaling each frame of the multiple frames received within the media stream includes supplementing each of the frames with additional detail derived based on an associated one of the one or more weight matrices.

In yet still another example system of any preceding system, the device further comprises an application programming interface (API) configured to transmit a request for a select weight matrix during the presentation of the media stream. The request specifies a matrix identifier stored in a remote database in association with a media title for the graphics-rendering application. In response to transmission of the request, the requested weight matrix is received and locally stored on the user device, and the user device is adapted to dynamically load the SRNN inference engine with the select weight matrix responsive to reaching a predefined checkpoint during the presentation of the media stream.

In yet still another example system of any preceding system, multiple weight matrices are pre-trained in association with the graphics-rendering application and SRNN inference engine is dynamically loaded with a different one of the weight matrices upon reaching each of multiple predefined checkpoints during the presentation of the media stream.

In yet another example system of any preceding system, multiple weight matrices are pre-trained in association with the graphics-rendering application and each of the weight matrices are trained with frames sampled from an associated one of multiple different discrete frame segments of the media stream.

In still another example system of any preceding system, each of the weight matrices is used to dynamically upscale frames of the associated one of the multiple different discrete frame segments during media streaming operations.

In another example system of any preceding system, the user device is a gaming console and the one or more weight matrices are jointly stored on the gaming console for dynamic loading into the SRNN inference engine in association with different checkpoints within the media stream.

An example computer-readable storage media disclosed herein encodes computer-executable instructions for executing a computer process that comprises: receiving, at a user device (e.g., FIG. 1, processing device 102), a media stream (e.g., FIG. 1, low-resolution media stream 114) including frames of a first resolution generated by a graphics-rendering application (e.g., FIG. 2, graphics-rendering application 210); on the user device, utilizing one or more weight matrices (e.g., FIG. 1, weight matrix 120) pre-trained in association with the graphics-rendering application to locally upscale each received frame of the media stream to a second resolution greater than the first resolution; and rendering the upscaled frames of the media stream to a display of the user device (e.g., FIG. 1, high resolution media stream 122).

On an example computer-readable storage media of any preceding computer-readable storage media, the computer process provides for upscaling each of the frames to the second resolution using a select weight matrix of the one or more weight matrices trained in association with the graphics rendering application. Upscaling of each of the frames includes supplementing each frame with additional detail derived based on the associated select weight matrix.

In another example computer-readable storage media of any preceding computer-readable storage media, the computer process further includes: transmitting, from the user device, a request for a select weight matrix. The request specifies a matrix identifier stored in a remote database in association with a media title for the graphics-rendering application. In response to transmission of the request, the select weight matrix is received and locally stored on the user device. The computer process further provides for dynamically loading a super-resolution neural net (SRNN) inference engine (e.g., FIG. 1, SRNN engine 112) with the select weight matrix when the rendering operation reaches a predefined checkpoint within the media stream.

In yet still example computer-readable storage media of any preceding computer-readable storage media, multiple weight matrices are pre-trained in association with the graphics-rendering application and the computer process further comprises loading the SRNN inference engine with a different one of the weight matrices upon reaching each of multiple predefined checkpoints during the presentation of the media stream.

An example system disclosed herein includes a means for receiving, at a user device, a media stream including frames of a first resolution generated by a graphics-rendering application and a means for utilizing one or more weight matrices pre-trained in association with the graphics-rendering application to locally upscale each received frame of the media stream to a second resolution greater than the first resolution at the user device. The system further provides a means for rendering the upscaled frames of the media stream to a display of the user device.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A method comprising:
   receiving, at a user device, a media stream including frames of a first resolution associated with a media title;
   on the user device, utilizing one or more weight matrices to locally upscale select frames of the media stream to a second resolution greater than the first resolution, the one or more weight matrices each being pre-trained to provide scaling weights for a particular segment or group of the frames associated with the media title; and
   rendering upscaled versions of the select frames of the media stream to a display of the user device.

2. The method of claim 1, wherein the select frames are upscaled to the second resolution using a select weight matrix of the one or more weight matrices, and wherein locally upscaling the select frames provides for supplementation of each of the select frames with additional detail derived based on the select weight matrix.

3. The method of claim 1, further comprising:
   receiving and storing metadata for the media stream, the metadata uniquely identifying multiple different weight matrices pretrained in association with the media title and further specifying checkpoint identifiers each identifying a checkpoint location within the media stream at which to load an associated one of the multiple different weight matrices into a super-resolution neural net (SRNN) inference engine; and
   loading the SRNN inference engine with a different one of the weight matrices upon reaching each of multiple predefined checkpoints during presentation of the media stream.

4. The method of claim 3, further comprising:
   identifying a select weight matrix of the multiple different weight matrices based on the metadata and while the media stream is being rendered to the display, the select weight matrix being associated with a select one of the checkpoint identifiers identifying an upcoming checkpoint location within the media stream;
   transmitting, from the user device, a request for the select weight matrix, the request specifying a matrix identifier stored in a remote database in association with the media title; and
   in response to transmission of the request, receiving and locally storing the select weight matrix on the user device.

5. The method of claim 1, wherein multiple weight matrices are pre-trained in association with the media title and each of the multiple weight matrices is trained based on frames sampled from an associated one of multiple different discrete frame segments of the media stream.

6. The method of claim 5, wherein each of the multiple weight matrices is used to dynamically upscale frames of the associated one of the multiple different discrete frame segments during media streaming operations.

7. The method of claim 1, wherein the user device is a gaming console and the one or more weight matrices are stored on the gaming console for dynamic loading into a super-resolution neural net (SRNN) inference engine at select times in association with different checkpoints within the media stream.

8. A system comprising:
   a super-resolution neural net (SRNN) inference engine stored in memory of a user device and configured to:
      receive a media stream including frames of a first resolution associated with a media title; and
      utilize one or more weight matrices to locally upscale select frames of the media stream from the first resolution to a second resolution greater than the first resolution, the one or more weight matrices each being pre-trained to provide scaling weights for a particular segment or group of the frames associated with the media title; and
   a media viewing application locally executing on the user device that presents upscaled versions of the select frames of the media stream to a display of the user device.

9. The system of claim 8, wherein the select frames are upscaled to the second resolution using a select weight matrix of the one or more weight matrices, and wherein locally upscaling the select frames provides for supplementation of each of the select frames with additional detail derived based on the select weight matrix.

10. The system of claim 8, wherein the media viewing application is configured to:
    receive and store metadata for the media stream, the metadata uniquely identifying multiple different weight matrices pretrained in association with the media title and further specifying checkpoint identifiers each identifying a checkpoint location within the media stream at which to load an associated one of the multiple different weight matrices into a super-resolution neural net (SRNN) inference engine; and
    load the SRNN inference engine with a different one of the multiple weight matrices upon reaching each of multiple predefined checkpoints during presentation of the media stream.

11. The system of claim 10, wherein the media viewing application is further configured to:
    identify a select weight matrix of the multiple different weight matrices based on the metadata and while the media stream is being rendered to the display, the select weight matrix being associated with a select one of the checkpoint identifiers identifying an upcoming checkpoint location within the media stream; and transmit, from the user device, a request for the select weight matrix, the request specifying a matrix identifier stored in a remote database in association with the media title; and in response to transmission of the request, receive and locally store the select weight matrix on the user device.

12. The system of claim 8, wherein multiple weight matrices are pre-trained in association with the media title and each of the multiple weight matrices is trained based on frames sampled from an associated one of multiple different discrete frame segments of the media stream.

13. The system of claim 8, wherein each of the weight matrices is used to dynamically upscale frames of the associated one of the multiple different discrete frame segments during streaming of the media stream.

14. One or more tangible computer-readable storage media encoding computer-executable instructions for executing a computer process comprising:

receiving, at a user device, a media stream including frames of a first resolution associated with a media title;

on the user device, utilizing one or more weight matrices to locally upscale select frames of the media stream to a second resolution greater than the first resolution, the one or more weight matrices each being pre-trained to provide scaling weights for a particular segment or group of the frames within the media stream; and rendering upscaled versions of the select frames of the media stream to a display of the user device.

15. The one or more computer-readable storage media of claim 14, wherein the select frames are upscaled to the second resolution using a select weight matrix of the one or more weight matrices, and wherein locally upscaling the select frames provides for supplementation of each of the select frames with additional detail derived based on the select weight matrix.

16. The one or more computer-readable storage media of claim 15, wherein the computer process further comprises:

receiving and storing metadata for the media stream, the metadata uniquely identifying multiple different weight matrices pretrained in association with the media title and further specifying checkpoint identifiers each identifying a checkpoint location within the media stream at which to load an associated one of the multiple different weight matrices into a super-resolution neural net (SRNN) inference engine; and loading the SRNN inference engine with a different one of the multiple weight matrices upon reaching each of multiple predefined checkpoints during presentation of the media stream.

17. The one or more computer-readable storage media of claim 16, wherein the computer process further comprises:

identifying a select weight matrix of the multiple different weight matrices based on the metadata and while the media stream is being rendered to the display, the select weight matrix being associated with a select one of the checkpoint identifiers identifying an upcoming checkpoint location within the media stream;

transmitting, from the user device, a request for the select weight matrix, the request specifying a matrix identifier stored in a remote database in association with the media title; and in response to transmission of the request, receiving and locally storing the select weight matrix on the user device.

18. The one or more computer-readable storage media of claim 16, wherein multiple weight matrices are pre-trained in association with the media title and each of the multiple weight matrices is trained based on frames sampled from an associated one of multiple different discrete frame segments of the media stream.

19. The one or more computer-readable storage media of claim 18, wherein each matrix of the multiple weight matrices is used for dynamically upscaling frames of the associated one of the multiple different discrete frame segments during media streaming operations.

20. The one or more computer-readable storage media of claim 14, wherein the user device is a gaming console and the one or more weight matrices are stored on the gaming console for dynamic loading into a super-resolution neural net (SRNN) inference engine at select times in association with different checkpoints within the media stream.

* * * * *